US006373157B1

(12) United States Patent
Sekine

(10) Patent No.: US 6,373,157 B1
(45) Date of Patent: Apr. 16, 2002

(54) STATOR

(75) Inventor: Katsumi Sekine, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/594,147

(22) Filed: Jun. 15, 2000

(51) Int. Cl.[7] .......................... H02K 1/10; F16D 41/12

(52) U.S. Cl. .......................... 310/78; 310/100; 192/46

(58) Field of Search .......................... 310/254, 75 R, 310/76, 78, 92, 96, 100, 43; 192/45.1, 40, 41 R, 46, 108

(56) References Cited

U.S. PATENT DOCUMENTS 4,510,405 A * 4/1985 Carroll et al. ................ 310/76
5,449,057 A * 9/1995 Frank .......................... 192/46
5,655,875 A * 8/1997 Sekine ....................... 415/123
5,806,643 A * 9/1998 Fitz .......................... 192/45.1
5,855,263 A * 1/1999 Fergle ......................... 192/46
5,918,715 A * 7/1999 Ruth et al. .................... 192/46
6,059,088 A * 5/2000 Sekine et al. ............ 192/107 T

* cited by examiner

*Primary Examiner*—Karl Temai
*Assistant Examiner*—Dang Dinh Le
(74) *Attorney, Agent, or Firm*—Jacobson Holman, PLLC

(57) ABSTRACT

A notched type one-way clutch (11) has a strut (8) which is accommodated, together with a spring (9), within a pocket portion (7) formed in a resinous stator body (1) and also has a notched plate (6), the notched plate (6) being combined with the stator body (1) in a relatively rotatable manner and provided with an engaging recess (10) with which the strut (8) comes into engagement in one rotational direction. A swing angle limiting portion (12) for limiting a swing motion of the strut (8) up to a predetermined angle is formed in the pocket portion (7). Further, a movement limiting portion (14) for limiting the movement of the strut (8) toward an anti-engaging face (**7*b*) side within the pocket portion (7) is formed on an engaging face (7*a*) side of the swing angle limiting portion (12**) integrally by molding.

7 Claims, 17 Drawing Sheets

D
E
11
8b
8c
10
8d
8e
14a
10b
8
10a
6c
5a
6
6d
7b
F
7a
5
14
14b
8a
12a
12
9
13
7
1

STATOR

TECHNICAL FIELD OF THE INVENTION

The present invention relates to a stator for use, for example, in a torque converter of an automatic transmission for an automobile.

RELATED ART

FIGS. 19 and 20 illustrate a stator described in U.S. patent application Ser. No. 09/466,854. In this stator, a notched type one-way clutch 57 is constituted by a strut 54 and a notched plate 55, the strut 54 being accommodated, together with a coiled spring 53, in a pocket portion 52 formed in a resinous stator body 51, the notched plate 55 being combined with the stator body 51 in a relatively rotatable manner and having an engaging recess 56 with which the strut 54 comes into engagement in one rotational direction. In the pocket portion 52, moreover, a swing angle limiting portion 58 for limiting a swing motion of the strut 54 up to a predetermined angle is formed integrally by molding.

In the stator illustrated in FIGS. 19 and 20, however, a relatively large spacing 59 is formed between the strut 54 and the swing angle limiting portion 58 and in a rotational direction (the right and left direction in the figures) of the stator, there arises the following problem.

When the notched plate 55 rotates (in arrow A direction) relatively with respect to the stator body 51 in a direction in which the one-way clutch 57 runs idle, the strut 54 is dragged by the notched plate 55 and moves in the same direction within the pocket portion 52, which movement may continue up to the position indicated with a chain line in FIG. 19. In this case, an engaging portion 54*a* of the strut 54 comes into strong contact at a tip end thereof with an anti-engaging face 52*a* of the pocket portion 52, so that the anti-engaging face 52*a* wears gradually, which may impede the operation of the clutch 57.

According to the structure of the stator shown in FIGS. 19 and 20, the strut 54, which is accommodated in the pocket portion 52 together with the coiled spring 53, is in direct contact with a bottom 52*b* of the pocket portion 52. Therefore, when the strut 54 swings with idle running of the clutch 57, the strut 54 slides on the bottom 52 of the pocket portion 52. As this sliding motion is repeated, the bottom 52*b* of the pocket portion 52 wears gradually, which may impede the operation of the clutch 57.

SUMMARY OF THE INVENTION

It is an object of the present invention to provide a stator capable of preventing wear of such inner faces as the non-engaging face and bottom of the pocket portion and hence capable of preventing the operation of the one-way clutch from being impeded by such wear.

For achieving the above-mentioned object, according to claim 1 in the present invention there is provided a stator including a notched type one-way clutch, the notched type one-way clutch having a strut which is accommodated, together with a spring, within a pocket portion formed in a resinous stator body and also having a notched plate, the notched plate being combined with the stator body in a relatively rotatable manner and provided with an engaging recess with which the strut comes into engagement in one rotational direction, with a swing angle limiting portion being formed in the pocket portion to limit a swing motion of the strut up to a predetermined angle, and wherein a movement limiting portion for limiting the movement of the strut toward an anti-engaging face side within the pocket portion is formed on an engaging face side of the swing angle limiting portion integrally by molding.

According to claim 2 in the present invention there is provided, in combination with the above claim 1, a stator wherein a spring is disposed between a bottom of a spring mounting portion and an engaging portion of the strut accommodated in the pocket portion in such a manner that the spring can expand and contract axially of the stator, the spring mounting portion being in the shape of a bottomed hole which is open to an end face of the swing angle limiting portion.

According to claim 3 in the present invention there is provided, in combination with the above claim 2, a stator wherein the notched plate-side face of the engaging portion of the strut is formed in a generally "︿" shape in section comprising a base end-side slant face and a tip end-side slant face, the tip end-side slant face being smaller in the angle of inclination than the base end-side slant face and being pushed against the notched plate by the resilience of the spring during idle running of the clutch.

According to claim 4 in the present invention there is provided, in combination with the above claim 2, a stator wherein the strut is formed so that an end portion of the strut located on a rearmost side in the relative rotation, which end portion comes into contact with an end face portion of the notched plate during idle running of the clutch, is positioned on a front side in the relative rotation with respect to an axis of the spring mounted in the bottomed hole-like spring mounting portion.

According to claim 5 in the present invention there is provided, in combination with the above claim 2, a stator wherein the strut is formed so that an end portion of the strut located on a rearmost side in the relative rotation, which end portion comes into contact with an end face portion of the notched plate during idle running of the clutch, is positioned at the same circumferential position as an axis of the spring mounted in the bottomed hole-like spring mounting portion.

According to claim 6 in the present invention there is provided, in combination with the above claim 4 or claim 5, a stator wherein a cutout portion is formed in a tip end of the engaging portion of the strut to realize the structure described in claim 4 or claim 5.

According to claim 7 in the present invention there is provided a stator including a notched type one-way clutch, the notched type one-way clutch having a strut which is accommodated, together with a spring, within a pocket portion formed in a resinous stator body and also having a notched plate, the notched plate being combined with the stator body in a relatively rotatable manner and provided with an engaging recess with which the strut comes into engagement in one rotational direction, with a swing angle limiting portion being formed in the pocket portion to limit a swing motion of the strut up to a predetermined angle, the spring being formed by a plate spring, the plate spring having an inner surface reinforcing portion formed integrally by molding and interposed between the strut and a bottom of the pocket portion.

As in the stator of claim 1 constructed as above, if a movement limiting portion for limiting the movement of the strut in a direction of an anti-engaging face within the pocket portion is formed on an engaging face side of the swing angle limiting portion in the pocket portion integrally by molding, it becomes possible to limit the strut movement toward the anti-engaging face side and prevent the strut from contacting the anti-engaging face. Out of both end faces in the rotational direction within the pocket portion, the one which supports the strut in an engaged state of the one-way clutch corresponds to the engaging face, while the opposite face corresponds to the anti-engaging face.

In the stator of claim 2 constructed as above, since a spring is disposed between the bottom of a bottomed hole-like spring mounting portion which is open to an end face of the swing angle limiting portion and an engaging portion of the strut accommodated in the pocket portion, the spring thus disposed being capable of expanding and contracting axially of the stator, the strut and the spring can be mounted completely in the pocket portion merely by first inserting the spring into the spring mounting portion and then putting the strut on the spring. Thus, the spring compressing work can be omitted at the time of mounting the strut.

In the stator of claim 3 constructed as above, since the notched plate-side face of the engaging portion of the strut is formed in a generally "︿" shape in section comprising a base end-side slant face and a tip end-side slant face, the tip end-side slant face being smaller in the angle of inclination than the base end-side slant face and being pushed against the notched plate by the resilience of the spring during idle running of the clutch, an outer corner portion at the boundary between the base portion and the engaging portion of the strut can be prevented from interfering with an end face portion of the notched plate under an axial force of the spring at the tip end-side slant face of the strut.

According to claim 4 constructed as above, since the strut is formed so that an end portion of the strut located on a rearmost side in the relative rotation, which end portion comes into contact with an end face portion of the notched plate during idle running of the clutch, is positioned on a front side in the relative rotation with respect to an axis of the spring mounted in the bottomed hole-like spring mounting portion, the engaging portion of the strut, which is biased resiliently by the spring, is pushed against the end face portion of the notched plate and a turning moment is developed in a direction in which the base portion of the strut is received deep in the pocket portion. In other words, a turning moment is not developed in a direction in which the base portion of the strut is pushed out from the pocket portion, so that the base portion of the strut is not pushed out from the pocket portion and an outside corner portion at the boundary between the base portion and the engaging portion can be prevented from interfering with the end face portion of the notched plate.

According to claim 5 constructed as above, since an end portion of the strut located on a rearmost side in the relative rotation, which end portion comes into contact with an end face portion of the notched plate during idle running of the clutch, is positioned at the same circumferential position as an axis of the spring mounted in the bottomed hole-like spring mounting portion, a turning moment, also in this case, is not generated in a direction in which the base portion of the strut is pushed out from the pocket portion. Therefore, the base portion is not pushed out from the pocket portion and an outside corner portion at the boundary between the base portion and the engaging portion of the strut can be prevented from interfering with the end face portion of the notched plate.

For realizing the structure described in claim 4 or claim 5 it is preferable to form a cutout portion in a tip end of the engaging portion of the strut as in claim 6 so that the position of the end portion of the strut on the rearmost side in the relative rotation which end portion comes into contact with the end face portion of the notched plate during idle running of the clutch be shifted to the front side in the relative rotation.

According to claim 7 constructed as above, since an inner surface reinforcing portion is interposed between the strut and the bottom of the pocket portion, it is possible to prevent the strut from coming into direct sliding contact with the bottom of the pocket portion.

EMBODIMENTS

Embodiments of the present invention will be described below in accordance with the drawings.

First Embodiment

Figure 1:
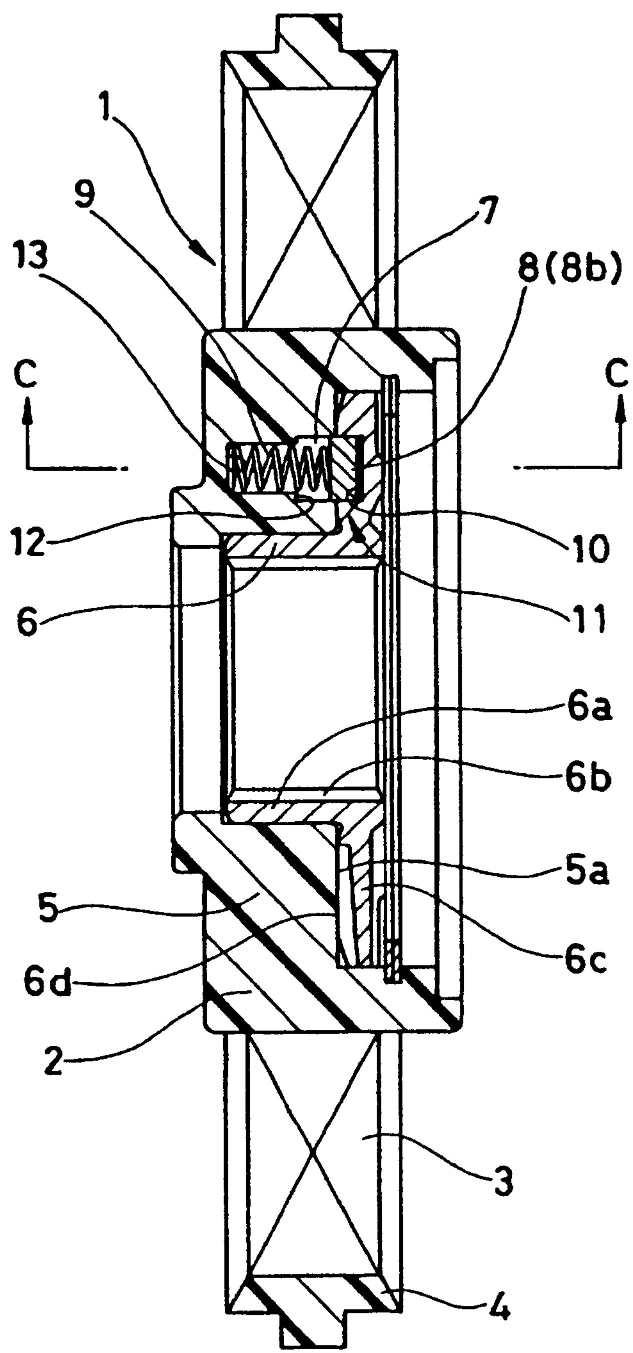
FIG. 1 is a sectional view of a stator according to the first embodiment of the present invention.

As shown in FIG. 1, a stator of the first embodiment is provided with a resinous, annular stator body 1 formed of a phenolic, resin or the like. Integral with the stator body 1 are an inner ring (also designated a shell or a stator shell) 2, a vane (also designated a blade) 3, and an outer ring (also designated a core or a stator core) 4. On an inner periphery side of the inner ring 2 is formed a resinous, annular pocket plate 5 integrally by molding. Further, on an inner periphery side of the stator body 1 is incorporated a notched plate 6 in a relatively rotatable manner. The notched plate 6 is formed annularly using a predetermined metal and has a generally L-shaped section. The notched plate 6 is integrally provided with a cylindrical portion 6*a* and a flange portion 6*c*, the cylindrical portion 6*a* having splines 6*b* formed on an inner peripheral surface thereof.

Figure 2:
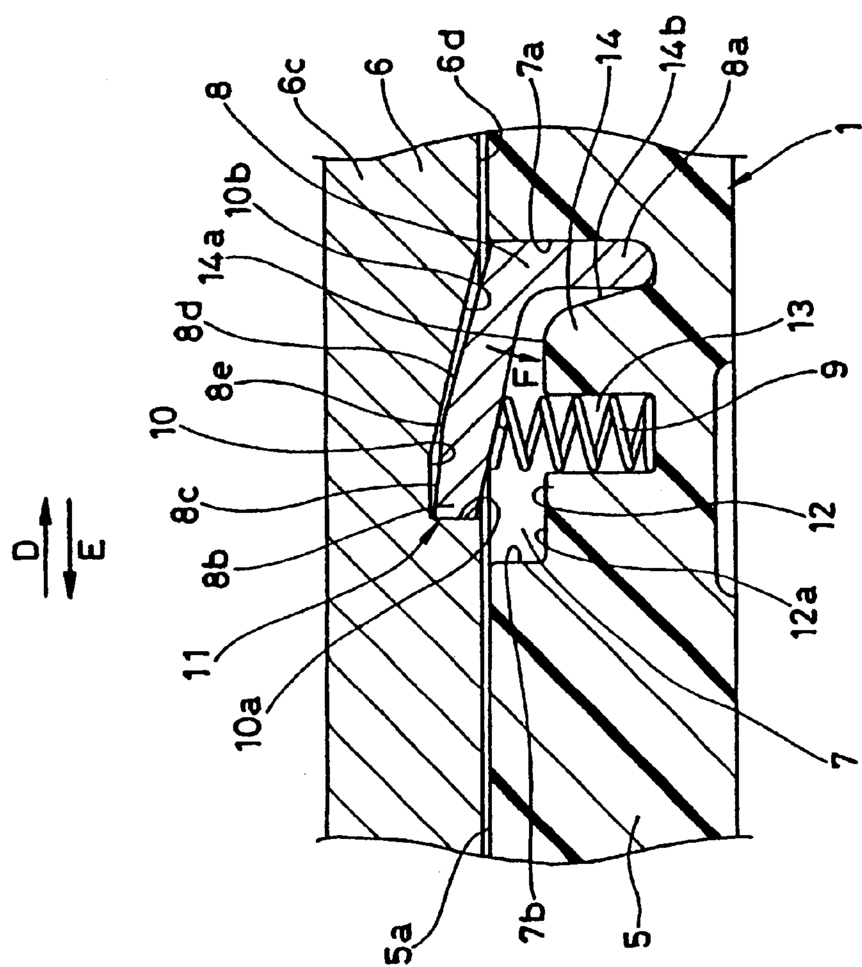
FIG. 2 is an enlarged sectional view taken on line C—C in FIG. 1.

As shown in FIG. 2, in an end face portion 5*a* of the pocket plate 5 are formed a predetermined number of pocket portions 7 in an equally spaced fashion (e.g., trisected) as spaces for receiving struts 8 and springs 9 therein. The struts 8 are accommodated respectively in the pocket portions 7 while being supported swingably by the springs 9. On the other hand, a predetermined number of engaging recesses 10 are formed in an equally spaced fashion (e.g., nonasected) in an end face portion 6*d* of the flange portion 6*c* of the notched plate 6 which end face portion is opposed to the end face portion 5*a* of the pocket plate 5. One inner walls 10*a* in a rotating direction of the engaging recesses 10 are formed at a relatively sharp rising angle for engagement of the struts 8 therewith, while opposite inner walls 10*b* in the rotational direction of the engaging recesses 10 are formed at a relatively gentle rising angle so as to permit the struts 8 to get over the inner walls. According to this engaging structure of the struts 8 and the engaging recesses 10, when the notched plate 6 tries to rotate relatively in the direction of arrow D in the figure with respect to the pocket plate 5, the struts 8 come into engagement with one inner walls 10*a* of the engaging recesses 10 to prevent the relative rotation, with only the relative rotation in the opposite E direction being allowed, whereby a notched type one-way clutch 11 is constituted.

Figure 3:
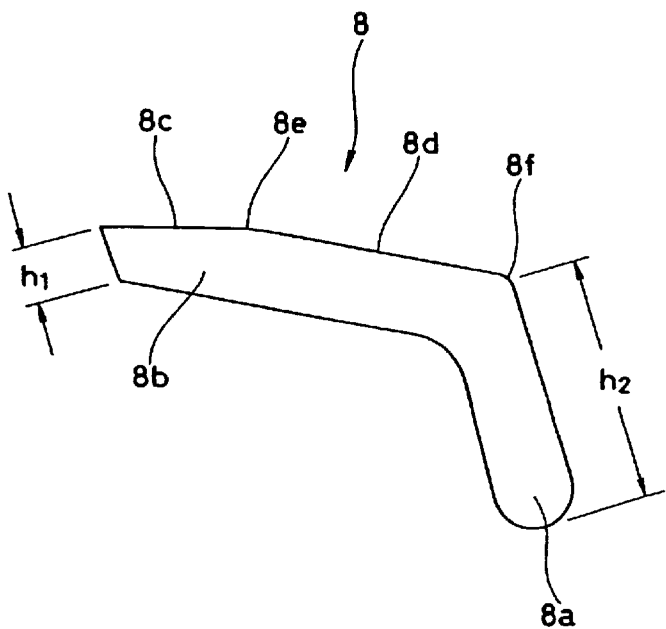
FIG. 3 is a front view of a strut.
Figure 5:
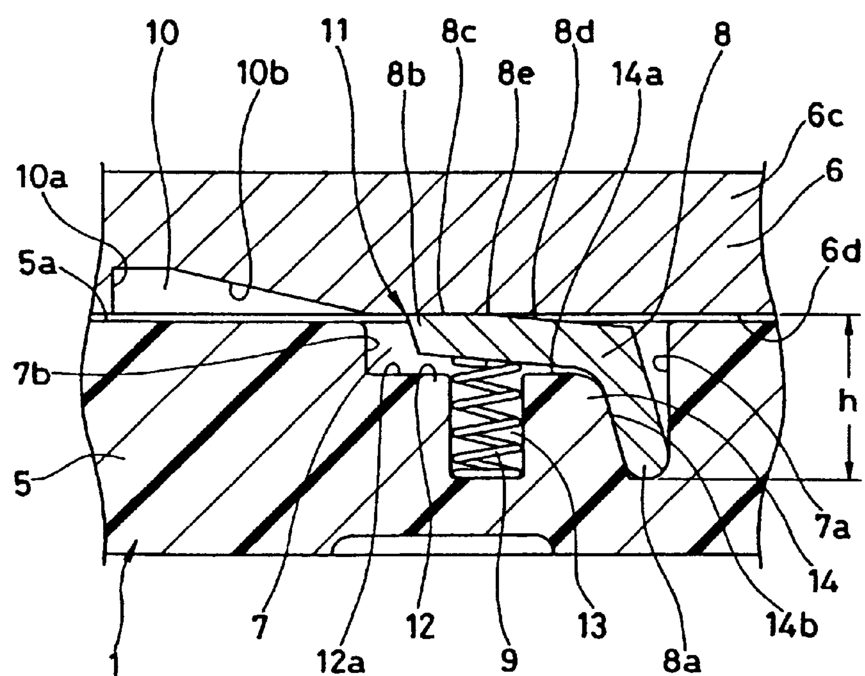
FIG. 5 is a sectional view of a principal portion, showing a state in which the strut swung in the stator.

As shown in FIG. 3, each strut 8 is formed in a generally L shape in section by molding a predetermined metal and is integrally provided with a planar base portion 8*a* disposed always in the associated pocket portion 7 and adapted to swing and an engaging portion 8*b* which is in the shape of an inclined plane, the engaging portion 8*b* being adapted to protrude and retract with respect to the pocket portion 7 with the swing motion of the base portion 8*a* and come into engagement upon protrusion thereof with the associated engaging recess 10 formed in the notched plate 6. An end portion (the lower end portion in the figure) of the base portion 8*a* is formed in an arcuate or semicircular shape in section and is rounded so as to permit the strut 8 to swing easily, while an end portion (the left end portion in the figure) of the engaging portion 8*b* is formed in a flat shape so that the said end portion comes into face contact with one inner wall 10*a* of the engaging recess 10 in the notched plate 6 upon engagement therewith. The notched plate 6-side face (the upper face in the figure) of the strut 8 is formed in a generally "へ" shape in section comprising a base end-side slant face 8*d* and a tip end-side slant face 8*c* which is smaller in the angle of inclination than the base end-side slant face 8*d*. As shown in FIG. 5, during idle running of the clutch 11, the tip end-side slant face 8*c* is pushed against the notched plate 6 and comes into face contact with the end face portion 6*d* of the notched plate 6 by the resilience of the associated spring 9. A boundary portion 8*e* between the tip end-side slant face 8*c* and the base end-side slant face 8*d* is formed arcuately in section and is rounded to disperse a generated stress.

Figure 4:
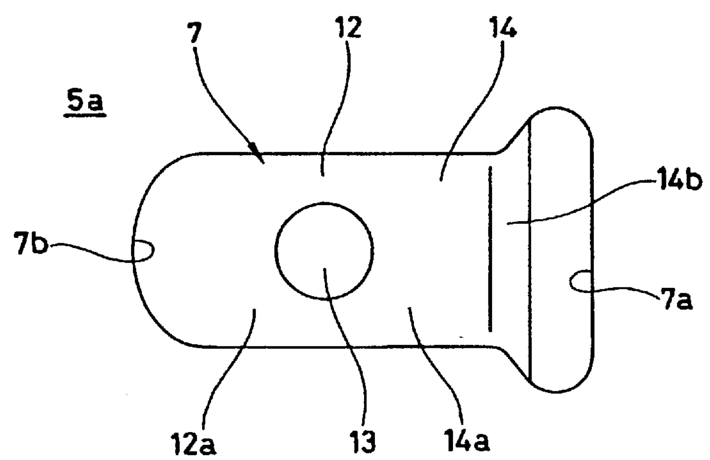
FIG. 4 is a plane view of a pocket portion.

As shown in FIGS. 2 and 4, the pocket portion 7 is open to the end face portion 5*a* of the pocket plate 5 and one inner wall thereof in the rotational direction is formed as a planar engaging face (also designated a strut engaging face or a strut supporting face) 7*a* which supports the base portion 8*a* of the strut 8 upon engagement of the clutch 11. Both end portions in the width direction of the engaging face 7*a* are recessed arcuately in plan and are rounded to disperse a stress induced when supporting the strut 8.

A swing angle limiting portion (also designated a swing stopper) 12 for limiting the swing motion of the strut 8 up to a predetermined angle is formed in the interior of the pocket portion 7 integrally by molding. Likewise, a movement limiting portion (also designated a movement stopper) 14 for limiting the movement of the strut 8 toward an anti-engaging face 7*b* in the pocket portion 7 is formed on the engaging face 7*a* side of the swing angle limiting portion 12 integrally by molding. A spring mounting portion 13, which is like a bottomed hole, is open to an end face (the upper face in FIG. 2) 12*a* of the swing angle limiting portion 12. The bottomed hole-like spring mounting portion 13 is formed axially (vertically in FIG. 2) of the stator and a spring 9, which is a coiled spring, is mounted in the spring mounting portion 13 so as to expand and contract also axially of the stator.

The swing angle limiting portion 12 is formed in the shape of a dam or an inner shelf throughout the entire width of the pocket portion 7. The movement limiting portion 14 is also formed in a dam, inner shelf, or stepped shape throughout the entire width of the pocket portion 7. An end face 12*a* of the swing angle limiting portion 12 and an end face 14*a* of the movement limiting portion 14 are each formed in the shape of a plane and are flush with each other, having the same height. A rising face 14*b* of the movement limiting portion 14, which is opposed to the base portion 8*a* of the strut 8, is tapered to let the base portion 8*a* come into face contact with the rising face 14*b* when the strut 8 swings. The space between the tapered rising face 14*a* and the engaging face 7*a* is formed so as to permit a swing motion of the base portion 8*a* of the strut 8 but not to permit movement thereof at all. The anti-engaging face 7*b* is opposed to the engaging face 7*a* and is formed arcuately in plan as shown in FIG. 4.

The spring 9 mounted in the spring mounting portion 13 is interposed between a bottom of the spring mounting portion 13 and the engaging portion 8*b* of the strut 8. The strut 8 swings in the direction of arrow F around an end portion (also designated a strut end portion) of its base portion 8*a* against the resilience of the spring 9 and it reverts to its illustrated posture under the resilience of the spring 9.

The stator of this embodiment constructed as above is characterized by exhibiting the following functions and effects.

Firstly, since the movement limiting portion 14 for limiting the movement of the strut 8 toward the anti-engaging face 7*b* in the pocket portion 7 is formed on the engaging face 7*a* side of the swing angle limiting portion 12 in the interior of the pocket portion 7 integrally by molding, the movement of the strut 8 toward the anti-engaging face 7*b*, in which movement of the strut is dragged by the notched plate 6, is limited and the contact thereof with the anti-engaging face 7*b* is prevented. Consequently, wear of the anti-engaging face 7*b* caused by such contact can be prevented and hence it is possible to prevent the operation of the one-way clutch 11 from being impeded by such wear. Thus, it is possible to ensure a normal operation of the one-way clutch 11 over a long period.

Moreover, since the coiled spring 9 is disposed between the bottom of the bottomed hole-like spring mounting portion 13 which opens to the end face 12*a* of the swing angle limiting portion 12 and the engaging portion 8*b* of the strut

8 so as to expand and contract axially of the stator, the strut 8 being accommodated in the pocket portion 7, the strut 8 and the spring 9 can be mounted completely in the pocket portion 7 by merely inserting the spring 9 into the spring mounting portion 13 and then putting the strut 8 on the spring 9. It is not required to compress the spring 9 when mounting the strut 8, thus making it possible to simplify the mounting operation for both components 8 and 9. Besides, by thus inserting the spring 9 vertically into the hole-like spring mounting portion 13 which is open to the end face 12*a* of the swing angle limiting portion 12, there is attained an effect that the spring 9 is held stably after the mounting thereof and is difficult to be displaced within the pocket portion 7. Further, since the hole-like spring mounting portion 13 functions as a guide for the expansion and contraction of the spring 9 caused by a swing motion of the strut 8, the operation of the spring 9 becomes stable and the life thereof is prolonged.

Since the notched plate 6-side face of the engaging portion 8*b* of the strut 8 is formed in a generally "へ" shape or "slightly stretched L" in section wherein the tip end-side slant face 8*c* is smaller in the angle of inclination than the base end-side slant face 8*d* and the tip end-side slant face 8*c* is pushed against the notched plate 6 by the resilience of the spring 9 during idle running of the clutch 11, an axial force of the spring 9 is received by the tip end-side slant face 8*c*, so that an outer corner portion 8*f* (see FIG. 3) at the boundary between the base portion 8*a* and the engaging portion 8*b* of the strut 8 is prevented from interfering with the end face portion 6*a* of the notched plate 6. Consequently, the strut 8 becomes difficult to be dragged by the notched plate 6. Also from this point it is possible to prevent the strut 8 from moving within the pocket portion 7. Moreover, by allowing the tip end-side slant face 8*c* to undertake the load of the spring 9 and interference with the notched plate 6, it is possible to restrict the height, h, of the strut 8 during a swing motion of the strut and hence possible to stabilize the strut 8 within the pocket portion 7.

Further, as noted earlier, since the notched plate 6-side face of the strut 8 is formed in a generally "へ" shape or "slightly stretched L" wherein the tip end-side slant face 8*c* is smaller in the angle of inclination than the base end-side slant face 8*d*, it is possible to prevent wear without decreasing required heights (sectional areas) $h_1$ and $h_2$ on the notched plate 6 side and the pocket portion 7 side, respectively, which heights are considered necessary for engagement.

Second Embodiment

Figure 6:
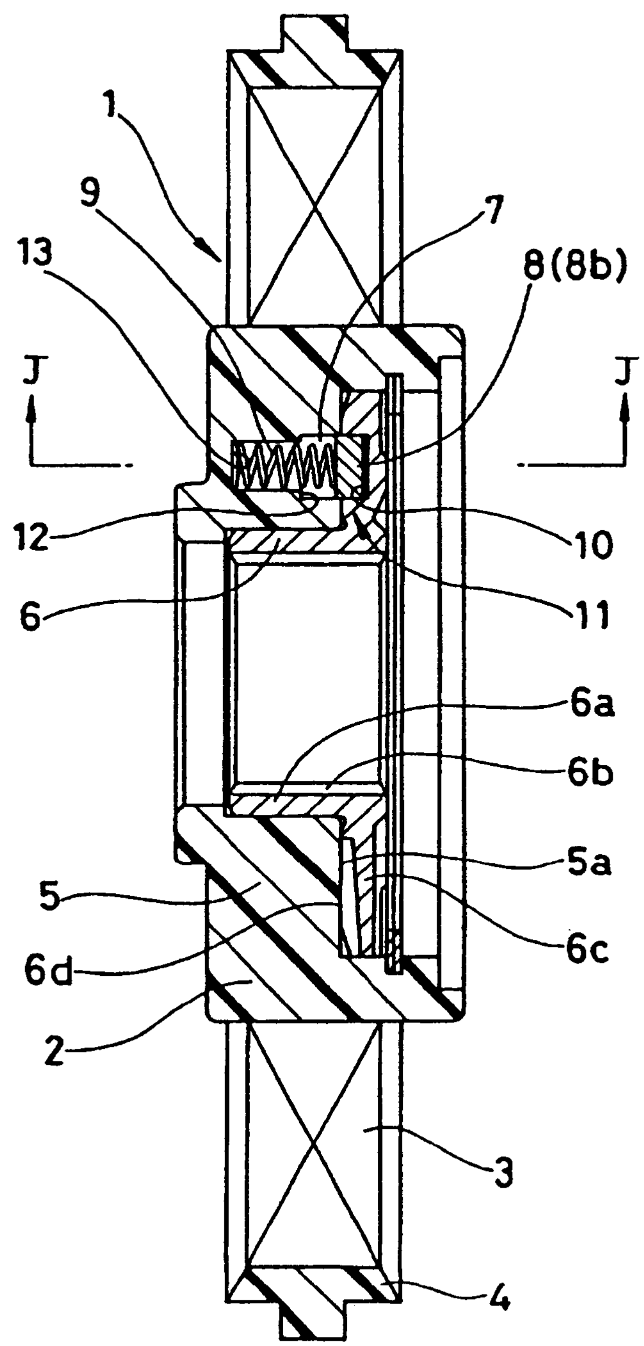
FIG. 6 is a sectional view of a stator according to the second embodiment of the present invention.

As shown in FIG. 6, a stator of the second embodiment is provided with a resinous, annular stator body 1 formed of a phenolic resin or the like. Integral with the stator body 1 are an inner ring (also designated a shell or a stator shell) 2, a vane (also designated a blade) 3, and an outer ring (also designated a core or a stator core) 4. On an inner periphery side of the inner ring 2 is formed a resinous, annular pocket plate 5 integrally by molding. Further, on an inner periphery side of the stator body 1 is incorporated a notched plate 6 in a relatively rotatable manner. The notched plate 6 is formed annularly using a predetermined metal and has a generally L-shaped section. The notched plate 6 is integrally provided with a cylindrical portion 6*a* and a flange portion 6*c*, the cylindrical portion 6*a* having splines 6*b* formed on an inner peripheral surface thereof.

Figure 7:
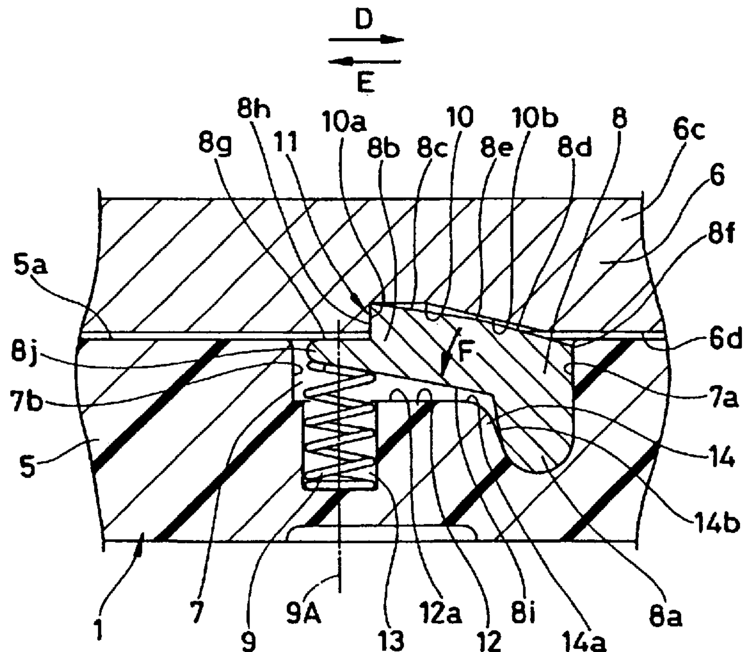
FIG. 7 is an enlarged sectional view taken on line J—J in FIG. 6.

As shown in FIG. 7, in an end face portion 5*a* of the pocket plate 5 are formed a predetermined number of pocket portions 7 in an equally spaced fashion (e.g., trisected) as spaces for receiving struts 8 and springs 9 therein. The struts 8 are accommodated respectively in the pocket portions 7 while being supported swingably by the springs 9. On the other hand, a predetermined number of engaging recesses 10 are formed in an equally spaced fashion (e.g., nonasected) in an end face portion 6*d* of the flange portion 6*c* of the notched plate 6 which end face portion is opposed to the end face portion 6*a* of the pocket plate 5. One inner walls 10*a* in a rotating direction of the engaging recesses 10 are formed at a relatively sharp rising angle for engagement of the struts 8 therewith, while opposite inner walls 10*b* in the rotating direction of the engaging recesses 10 are formed at a relatively gentle rising angle so as to permit the struts 8 to get over the inner walls. According to this engaging structure of the struts 8 and the engaging recesses 10, when the notched plate 6 tries to rotate relatively in the direction of arrow D in the figure with respect to the pocket plate 5, the struts 8 come into engagement with the inner walls 10*a* of the engaging recesses 10 to prevent the relative rotation, with only the relative rotation in the opposite E direction being allowed, whereby a notched type one-way clutch 11 is constituted.

Each strut 8 is formed in a generally L shape in section by molding a predetermined metal and is integrally provided with a planar base portion 8*a* disposed always in the associated pocket portion 7 and adapted to swing and an engaging portion 8*b* which is in the shape of an inclined plane, the engaging portion 8*b* being adapted to protrude and retract with respect to the pocket portion 7 with the swing motion of the base portion 8*a* and come into engagement upon protrusion thereof with the associated engaging recess 10 formed in the notched plate 6. An end portion (the lower end portion in the figure) of the base portion 8*a* is formed in an arcuate or semicircular shape in section and is rounded so as to permit the strut 8 to swing easily, while an end portion (the left end portion in the figure) of the engaging portion 8*b* is formed with a cutout portion 8*g* which faces the notched plate 6 and a rising face thereof is formed as an engaging face 8*h* for engagement with one inner wall 10*a* of the engaging recess 10. The engaging face 8*h* is formed in a flat shape so as to come into face contact with one inner wall 10*a* of the engaging recess 10 upon engagement therewith. The notched plate 6-side face (the upper face in the figure) of the strut 8 is formed in a generally "へ" shape in section comprising a base end-side slant face 8*d* and a tip end-side slant face 8*c* which is smaller in the angle of inclination than the base end-side slant face 8*d*.Consequently, during idle running of the clutch 11, the tip end-side slant face 8*c* is pushed against the notched plate 6 and comes into face contact with the end face portion 6*d* of the notched plate 6 by the resilience of the associated spring 9. A boundary portion 8*e* between the tip end-side slant face 8*c* and the base end-side slant face 8*d* is formed arcuately in section and is rounded to disperse a generated stress. A face 8*i* of the engaging portion 8*b* of the strut 8, which face 8*i* is located on the side opposite to the notched plate, is formed in parallel with the tip end-side slant face 8*c* or at a larger angle (in parallel with the base end-side slant face 8*d*). A front end of the engaging portion 8*b* of the strut 8 with the cutout portion 8*g* is formed in a shape such that a projecting portion 8*j* is formed on a still tip end side of the engaging face 8*h* of the strut 8 which comes into engagement with one inner wall 10*a* of the engaging recess 10.

The pocket portion 7 is open to the end face portion 5*a* of the pocket plate 5 and one inner wall thereof in the rotational direction is formed as a planar engaging face (also designated a strut engaging face or a strut supporting face) 7*a* which supports the base portion 8*a* of the strut 8 upon engagement of the clutch 11. Both end portions in the width direction of the engaging face 7*a* are recessed arcuately in plan and are rounded to disperse a stress induced when supporting the strut 8.

Figure 8:
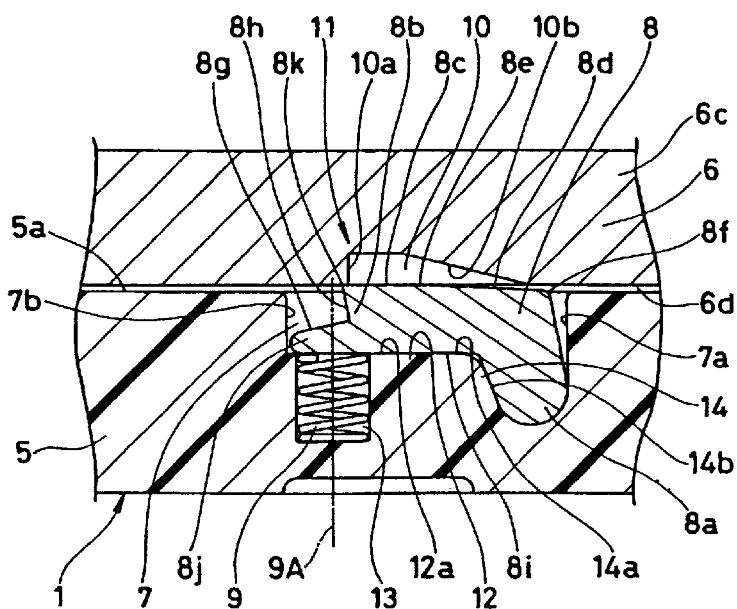
FIG. 8 is a sectional view of a principal portion, showing a state in which a strut in the stator of the second embodiment swung.

A swing angle limiting portion (also designated a swing stopper) 12 for limiting the swing motion of the strut 8 up to a predetermined angle is formed in the interior of the pocket portion 7 integrally by molding. Likewise, a movement limiting portion (also designated a movement stopper) 14 for limiting the movement of the strut 8 toward an anti-engaging face 7*b* in the pocket portion 7 is formed on the engaging face 7*a* side of the swing angle limiting portion 12 integrally by molding. A spring mounting portion 13, which is like a bottomed hole, is open to an end face (the upper face in FIG. 7) 12*a* of the swing angle limiting portion 12. The bottomed hole-like spring mounting portion 13 is formed axially (vertically in FIG. 7) of the stator and a spring 9, which is a coiled spring, is mounted in the spring mounting portion 13 so as to expand and contract also axially of the stator. The engaging face 8*h* of the strut 8 has been retreated from the tip end portion of the strut 8 because the cutout portion 8*g* is formed, so that the engaging face 8*h* always lies on the front side in the relative rotation (the front side in the relative rotation of the strut 8 with respect to the notched plate 6 during idle running of the clutch 11; the right-hand side in FIG. 7) with respect to an axis 9A of the spring 9 irrespective of a swing posture of the strut 8. As shown in FIG. 8, the strut 8 is formed so that the position (on a circumference) of an end portion 8*k* located on a rearmost side in the relative rotation (a rearmost side in the relative rotation of the strut 8 with respect to the notched plate 6 during idle running of the clutch 11; the right-hand side in FIG. 7), which end portion of the strut comes into contact with the end face portion 6*d* of the notched plate 6 during idle running of the clutch 11, lies on the front side in the relative rotation with respect to the axis 9A of the spring 9 mounted in the bottomed hole-like spring mounting portion 13.

The swing angle limiting portion 12 is formed in the shape of a dam or an inner shelf throughout the entire width of the pocket portion 7. The movement limiting portion 14 is also formed in a dam, inner shelf, or stepped shape throughout the entire width of the pocket portion 7. An end face 12*a* of the swing angle limiting portion 12 and an end face 14*a* of the movement limiting portion 14 are each formed in the shape of a plane and are flush with each other, having the same height. A rising face 14*b* of the movement limiting portion 14, which is opposed to the base portion 8*a* of the strut 8, is tapered to let the base portion 8*a* come into face contact with the rising face 14*b* when the strut 8 swings. The space between the tapered rising face 14*a* and the engaging face 7*a* is formed so as to permit a swing motion of the base portion 8*a* of the strut 8 but not to permit movement thereof at all. The anti-engaging face 7*b* is opposed to the engaging face 7*a* and is formed arcuately in plan.

The spring 9 mounted in the spring mounting portion 13 is interposed between a bottom of the spring mounting portion 13 and the engaging portion 8*b* of the strut 8. The strut 8 swings in the direction of arrow F around an end portion (also designated a strut end portion) of its base portion 8*a* against the resilience of the spring 9 and it reverts to its illustrated posture under the resilience of the spring 9.

The stator of this second embodiment constructed as above is characterized by exhibiting the following functions and effects.

Firstly, since the movement limiting portion 14 for limiting the movement of the strut 8 toward the anti-engaging face 7*b* in the pocket portion 7 is formed on the engaging face 7*a* side of the swing angle limiting portion 12 in the interior of the pocket portion 7 integrally by molding, the movement of the strut 8 toward the anti-engaging face 7*b*, in which movement the strut is dragged by the notched plate 6, is limited and the contact thereof with the anti-engaging face 7*b* is prevented. Consequently, wear of the anti-engaging face 7*b* caused by such contact can be prevented and hence it is possible to prevent the operation of the one-way clutch 11 from being impeded by such wear. Thus, it is possible to ensure a normal operation of the one-way clutch 11 over a long period.

Moreover, since the coiled spring 9 is disposed between the bottom of the bottomed hole-like spring mounting portion 13 which opens to the end face 12*a* of the swing angle limiting portion 12 and the engaging portion 8*b* of the strut 8 so as to expand and contract axially of the stator, the strut 8 being accommodated in the pocket portion 7, the strut 8 and the spring 9 can be mounted completely in the pocket portion 7 by merely inserting the spring 9 into the spring mounting portion 13 and then putting the strut 8 on the spring 9. It is not required to compress the spring 9 when mounting the strut 8, thus making it possible to simplify the mounting operation for both components 8 and 9. Besides, by thus inserting the spring 9 vertically into the hole-like spring mounting portion 13 which is open to the end face 12*a* of the swing angle limiting portion 12, there is attained an effect that the spring 9 is held stably after the mounting thereof and is difficult to be displaced within the pocket portion 7. Further, since the hole-like spring mounting portion 13 functions as a guide for the expansion and contraction of the spring 9 caused by a swing motion of the strut 8, the operation of the spring 9 becomes stable and the life thereof is prolonged.

Since the notched plate 6-side face of the engaging portion 8*b* of the strut 8 is formed in a generally "へ" shape in section wherein the tip end-side slant face 8*c* is smaller in the angle of inclination than the base end-side slant face 8*d* and the tip end-side slant face 8*c* is pushed against the notched plate 6 by the resilience of the spring 9 during idle running of the clutch 11, an axial force of the spring 9 is received by the tip end-side slant face 8*c*, so that an outer corner portion 8*f* at the boundary between the base portion 8*a* and the engaging portion 8*b* of the strut 8 is prevented from interfering with the end face portion 6*a* of the notched plate 6. Consequently, the strut 8 becomes difficult to be dragged by the notched plate 6. Also from this point it is possible to prevent the strut 8 from moving within the pocket portion 7 Moreover, by allowing the tip end-side slant face 8*c* to undertake the load of the spring 9 and interference with the notched plate 6, it is possible to restrict the height, h, of the strut 8 during a swing motion of the strut and hence possible to stabilize the strut 8 within the pocket portion 7.

Further, since the engaging face 8*h* of the strut 8 is always located on the front side in the relative rotation with respect to the axis 9A of the spring 9 irrespective of a swing posture of the strut 8 and since the strut 8 is formed so that the end portion 8*k* of the strut on the rearmost side in the relative rotation, which end portion of the strut comes into contact with the end face portion 6*d* of the notched plate 6 during idle running of the clutch 11, is positioned on the front end side in the relative rotation with respect to the axis 9A of the spring 9 mounted in the bottomed hole-like spring mounting portion 13, the engaging portion 8*b* of the strut 8, which is biased by the spring 9, is pushed against the end face portion 6*d* of the notched plate 6 (i.e., is pushed out from the pocket portion 7) and at the same time there occurs a turning moment in a direction (clockwise in FIG. 8) in which the base portion 8*a* is received deeply into the pocket portion 7. In other words, there does not occur a turning moment in a direction (counterclockwise in FIG. 8) in which the base portion 8*a* is pushed out from the pocket portion 7. Accordingly, the outer corner portion 8*f* at the boundary between the base portion 8*a* and the engaging portion 8*b* of the strut 8 can be prevented from interfering with the end face portion 6*a* of the notched plate 6 and hence it is possible to prevent wear of the outer corner portion 8*f* caused by interference thereof with the end face portion 6*a* of the notched plate. Moreover, since the face 8*i* of the engaging portion 8*b* of the strut 8, which face is located on the side opposite to the notched plate, is formed in parallel with the tip end-side slant face 8*c* or at a larger angle, a turning moment is difficult to occur in a direction in which the base portion 8*a* is pushed out from the pocket portion 7. This function and effect can be obtained also in the case where the strut 8 is formed so that its end portion 8*k* on the rearmost side in the relative rotation, which end portion comes into contact with the end face portion 6*d* of the notched plate 6 during idle running of the clutch 11, is located at the same circumferential position as the axis 9A of the spring 9 mounted in the bottomed hole-like spring mounting portion 13.

Further, as noted earlier, since the notched plate 6-side face of the strut 8 is formed in a generally "⌒" shape in section wherein the tip end-side slant face 8*c* is smaller in the angle of inclination than the base end-side slant face 8*d*, it is possible to prevent wear without decreasing the required heights (sectional areas) on the notched plate 6 side and the pocket portion 7 side, respectively, which heights are considered necessary for engagement.

Third Embodiment

Figure 9:
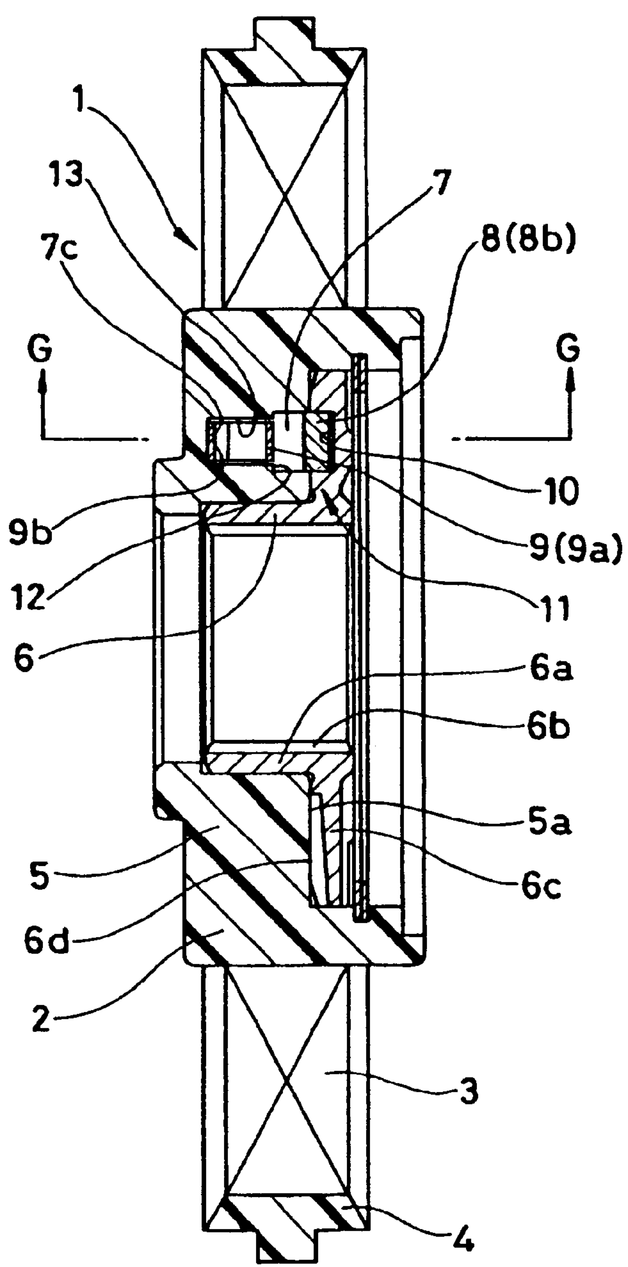
FIG. 9 is a sectional view of a stator according to the third embodiment of the present invention.
Figure 10:
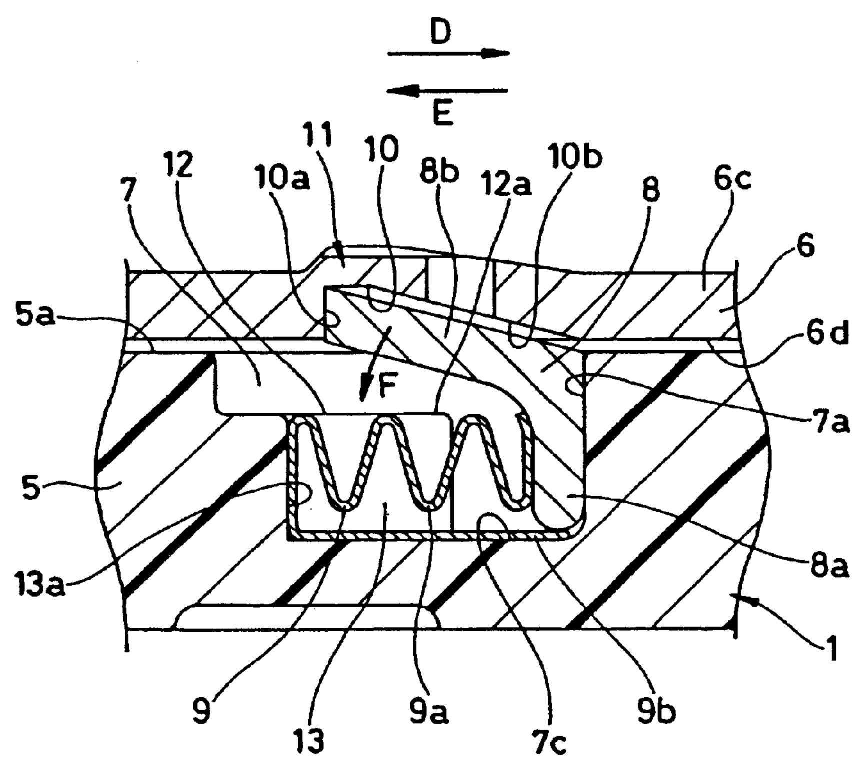
FIG. 10 is an enlarged sectional view taken on line G—G in FIG. 9.

As shown in FIG. 9, a stator of the third embodiment is provided with a resinous, annular stator body 1 formed of a phenolic resin or the like. Integral with the stator body 1 are an inner ring (also designated a shell or a stator shell) 2, a vane (also designated a blade) 3, and an outer ring (also designated a core or a stator core) 4. On an inner periphery side of the inner ring 2 is formed a resinous, annular pocket plate 5 integrally by molding. Further, on an inner periphery side of the stator body 1 is incorporated a notched plate 6 in a relatively rotatable manner. The notched plate 6 is formed annularly using a predetermined metal and has a generally L-shaped section. The notched plate 6 is integrally provided with a cylindrical portion 6*a* and a flange portion 6*c*, the cylindrical portion 6*a* having splines 6*b* formed on an inner peripheral surface thereof As shown in FIG. 10, in an end face portion 5*a* of the pocket plate 5 are formed a predetermined number of pocket portions 7 in an equally spaced fashion (e.g., trisected) as spaces for receiving struts 8 and springs 9 therein. The struts 8 are accommodated respectively in the pocket portions 7 while being supported swingably by the springs 9. On the other hand, a predetermined number of engaging recesses 10 are formed in an equally spaced fashion (e.g., nonasected) in an end face portion 6*d* of the flange portion 6*c* of the notched plate 6 which end face portion is opposed to the end face portion 5*a* of the pocket plate 5. One inner walls 10*a* in a rotating direction of the engaging recesses 10 are formed at a relatively sharp rising angle for engagement of the struts 8 therewith, while opposite inner walls 10*b* in the rotational direction of the engaging recesses 10 are formed at a relatively gentle rising angle so as to permit the struts 8 to get over the inner walls. According to this engaging structure of the struts 8 and the engaging recesses 10, when the notched plate 6 tries to rotate relatively in the direction of arrow D in the figure with respect to the pocket plate 5, the struts 8 come into engagement with one inner walls 10*a* of the engaging recesses 10 to prevent the relative rotation, with only the relative rotation in the opposite E direction being allowed, whereby a notched type one-way clutch 11 is constituted.

Each strut 8 is formed in a generally L shape in section by molding a p redetermined metal and is integrally provided with a planar base portion 8*a* disposed always in the associated pocket portion 7 and adapted to swing and an engaging portion 8*b* which is in the shape of an inclined plane, the engaging portion 8*b* being adapted to protrude and retract with respect to the pocket portion 7 with the swing motion of the base portion 8*a* and come into engagement upon protrusion thereof with the associated engaging recess 10 formed in the notched plate 6. An end portion (the lower end portion in the figure) of the base portion 8*a* is formed in an arcuate or semicircular shape in section and is rounded so as to permit the strut 8 to swing easily, while an end portion (the left end portion in the figure) of the engaging portion 8*b* is formed in a flat shape so that the said end portion comes into face contact with one inner wall 10*a* of the engaging recess 10 in the notched plate 6 upon engagement therewith.

Figure 11:
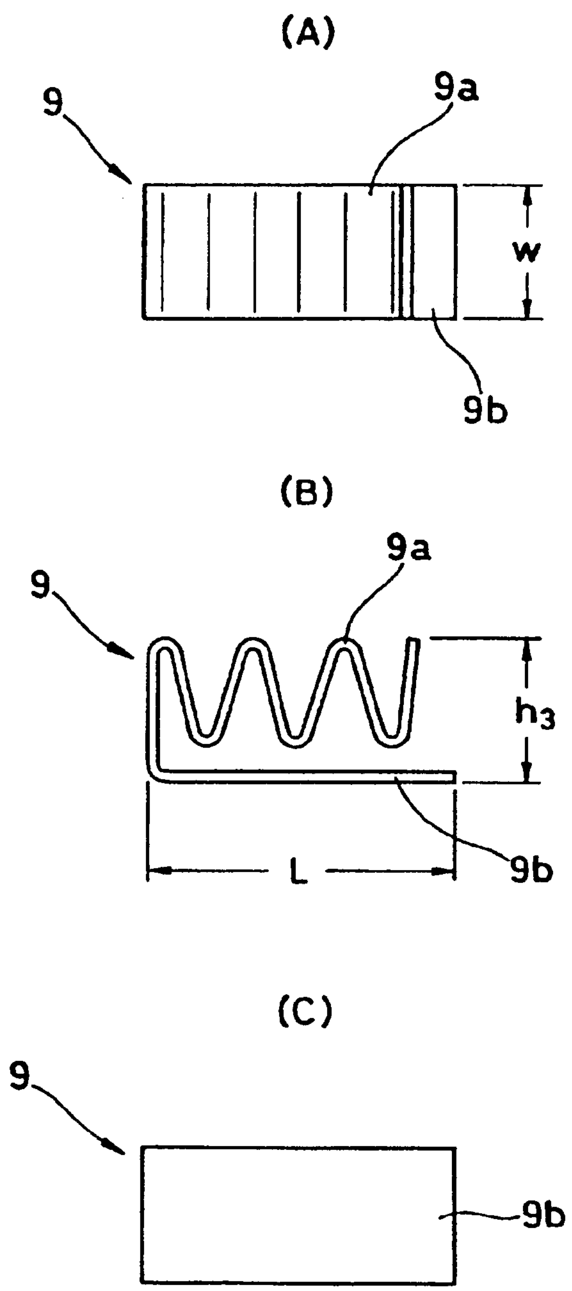
FIGS. 11(A), (B), and (C) are a plane view, a front view, and a bottom view, respectively, of a spring.
Figure 12:
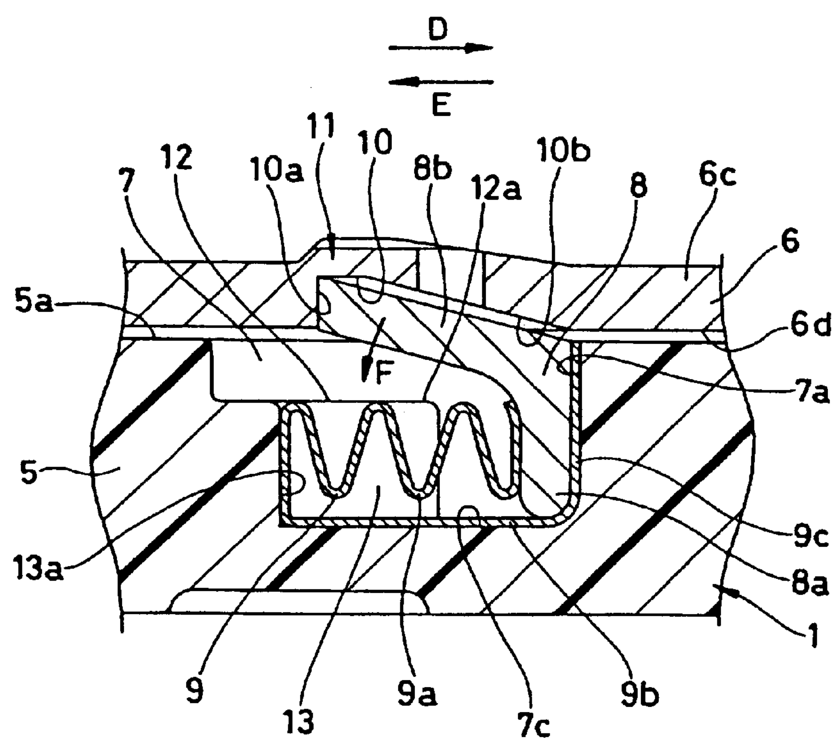
FIG. 12 is a sectional view of a principal portion of the stator of the third embodiment, showing another example of a spring.

As shown in FIG. 11, the spring 9 is formed as a plate spring using a predetermined metallic plate such as a spring steel plate and is corrugated in front view. An inner surface reinforcing portion (also designated a straight surface) 9*b* is formed integrally from one end of a plate spring portion 9*a* formed as such a plate spring to the opposite end side in an inverted fashion and at the same width as the width of the plate spring portion 9*a*. As shown in FIG. 10, the inner surface reinforcing portion 9*b* is laid on a bottom 7*c* of the pocket portion 7 and is thus interposed between the base portion 8*a* of the strut 8 and the bottom 7*c* of the pocket portion 7 to reinforce or protect the bottom 7*c* which is made of resin. As shown in FIG. 12, if the inner surface reinforcing portion 9*b* is further extended to form a rising portion 9*c* which is interposed between the base portion 8*a* of the strut 8 and an engaging face 7*a* of the pocket portion 7, the engaging face 7*a*, which is made of resin, can be protected or reinforced by the rising portion 9*c*.

As shown in FIG. 10, the pocket portion 7 is open to the end face poriton 5*a* of the pocket plate 5 and one inner wall thereof in the rotational direction is formed as a planar engaging face (also designated a strut engaging face or a strut supporting face) 7*a* which supports the base portion 8*a* of the strut 8 upon engagement of the clutch 11. Both end portions in the width direction of the engaging face 7*a* are recessed arcuately in plan and are rounded to disperse a stress induced when supporting the strut 8.

A swing angle limiting portion (also designated a swing stopper) 12 for limiting the swing motion of the strut 8 up to a predetermined angle, which portion is like a dam or an inner shelf, is formed in the interior of the pocket portion 7 integrally by molding. Centrally in the width direction of the swing angle limiting portion 12 is formed a slot-like spring mounting portion 13 which is like a cutout portion formed by cutting out the swing angle limiting portion 12 partially, an d the spring 9 is mounted into the spring mounting portion 13. When the spring 9 is mounted in the spring mounting portion 13, its plate spring portion 9*a* is interposed in a moderately compressed state between an end wall portion 13*a* of the spring mounting portion 13 and the base portion 8*a* of the strut 8. With the spring 9 thus mounted, the strut 8 swings, centered on an end portion (also designated a strut end portion) of its base portion 8*a*, in the F direction against the resilience of the plate spring portion 9*a* and reverts to its illustrated posture under the resilience of the plate spring portion 9*a*. The width of the spring mounting portion 13 is set smaller than the width of the strut 8 so that the engaging portion 8*b* of the strut 8 comes into abutment against an end face 12*a* of the swing angle limiting portion 12 when the strut swings, to limit the swing angle of the strut.

The length L of the inner surface reinforcing portion 9*b* of the spring 9 mounted in the spring mounting portion 13 is set almost equal to the length from the end wall portion 13*a* of the spring mounting portion 13 up to the engaging face 7*a*, and the width, w, thereof is set almost equal to the width of the spring mounting portion 13. An overall height, $h_3$ of the spring 9 is set almost equal to or lower than the height of the spring mounting portion 13 or the swing angle limiting portion 12 so as to avoid contact of the strut 8 with the spring 9 during a swing motion of the strut.

The resinous stator constructed as above is characterized by exhibiting the following functions and effects.

Firstly, since the inner surface reinforcing portion 9*b* formed integrally with the plate spring portion 9*a* of the spring 9 is interposed between the base portion 8*a* of the strut 8 and the bottom 7*c* of the pocket portion 7 which receives the strut 8 therein and since the strut 8 is prevented from direct sliding contact with the bottom 7*c* of the pocket portion 7, it is possible to prevent wear of the bottom 7*c* of the pocket portion 7. Besides, in the case where the rising portion 9*c* is integral with the inner surface reinforcing portion 9*b* of the spring 9 and is interposed between the base portion 8*a* of the strut 8 and the engaging face 7*a* of the pocket portion 7, the engaging face 7*a* can be reinforced by the rising portion 9*c*, whereby it is possible to prevent wear of the inner surface of the pocket portion 7 and hence possible to prevent the operation of the one-way clutch 11 from being impeded by such wear. Consequently, a normal operation of the one-way clutch 11 can be ensured over a long period.

Moreover, since the inner surface reinforcing portion 9*b* is integral with the plate spring portion 9*a* of the spring 9, it does not lead to an increase in the number of components. Therefore, the fabrication and mounting of the spring 9 do not become so difficult and it is possible to ensure the easiness of its handling.

Further, since the length L of the inner surface reinforcing portion 9*b* is set almost equal to the length from the end wall portion 13*a* of the spring mounting portion 13 to the engaging face 7*a* and the width, w, thereof is set almost equal to the width of the spring mounting portion 13, the spring 9 integral with the inner surface reinforcing portion 9*b* is held stably and therefore it is possible to enhance the rigidity of the spring 9.

Fourth Embodiment

Figure 13:
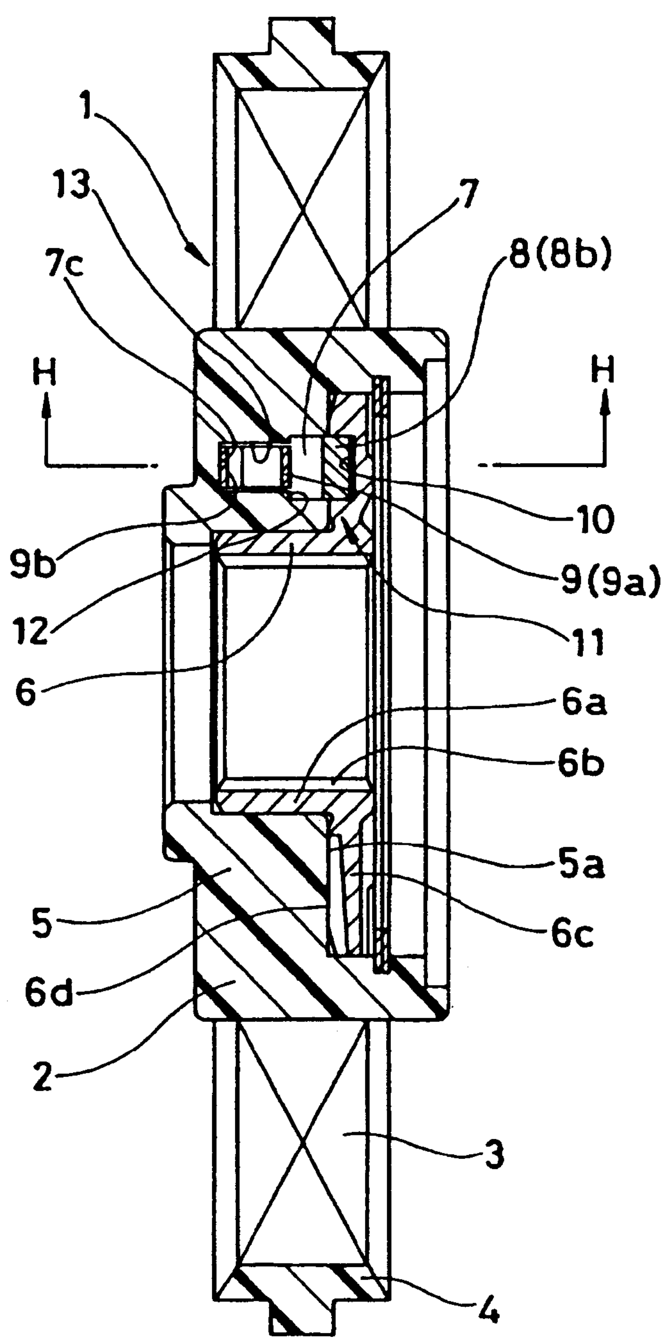
FIG. 13 is a sectional view of a stator according to the fourth embodiment of the present invention.

As shown in FIG. 13, a stator of the fourth embodiment is provided with a resinous, annular stator body 1 formed of a phenolic resin or the like. Integral with the stator body 1 are an inner ring (also designated a shell or a stator shell) 2, a vane (also designated a blade) 3, and an outer ring (also designated a core or a stator core) 4. On an inner periphery side of the inner ring 2 is formed a resinous, annular pocket plate 5 integrally by molding. Further, on an inner periphery side of the stator body 1 is incorporated a notched plate 6 in a relatively rotatable manner. The notched plate 6 is formed annularly using a predetermined metal and has a generally L-shaped section. The notched plate 6 is integrally provided with a cylindrical portion 6*a* and a flange portion 6*c*, the cylindrical portion 6*a* having splines 6*b* formed on an inner peripheral surface thereof.

Figure 14:
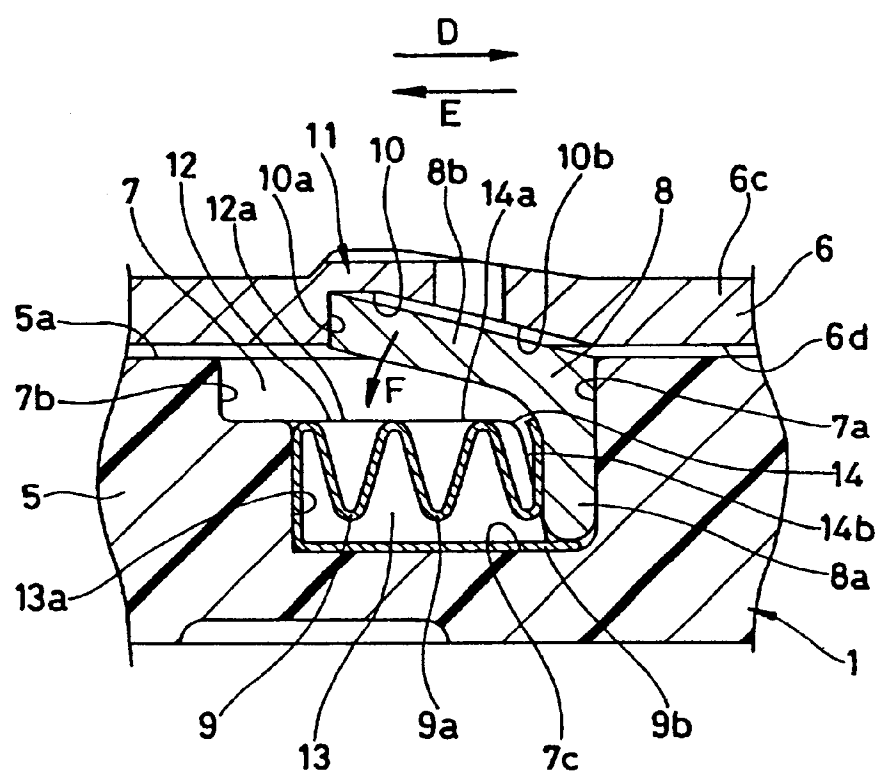
FIG. 14 is an enlarged sectional view taken on line H—H in FIG. 13.

As shown in FIG. 14, in an end face portion 5*a* of the pocket plate 5 are formed a predetermined number of pocket portions 7 in an equally spaced fashion (e.g., trisected) as spaces for receiving struts 8 and springs 9 therein. The struts 8 are accommodated respectively in the pocket portions 7 while being supported swingably by the springs 9. On the other hand, a predetermined number of engaging recesses 10 are formed in an equally spaced fashion (e.g., nonasected) in an end face portion 6*d* of the flange portion 6*c* of the notched plate 6 which end face portion is opposed to the end face portion 5*a* of the pocket plate 5. One inner walls 10*a* in a rotating direction of the engaging recesses 10 are formed at a relatively sharp rising angle for engagement of the struts 8 therewith, while opposite inner walls 10*b* in the rotational direction of the engaging recesses 10 are formed at a relatively gentle rising angle so as to permit the struts 8 to get over the inner walls. According to this engaging structure of the struts 8 and the engaging recesses 10, when the notched plate 6 tries to rotate relatively in the direction of arrow D in the figure with respect to the pocket plate 5, the struts 8 come into engagement with one inner walls 10*a* of the engaging recesses 10 to prevent the relative rotation, with only the relative rotation in the opposite E direction being allowed, whereby a notched type one-way clutch 11 is constituted.

Each strut 8 is formed in a generally L shape in section by molding a predetermined metal and is integrally provided with a planar base portion 8*a* disposed always in the associated pocket portion 7 and an engaging portion 8*b* which is in the shape of an inclined plane, the engaging portion 8*b* being adapted to protrude and retract with respect to the pocket portion 7 with the swing motion of the base portion 8*a* and come into engagement upon protrusion thereof with the associated engaging recess 10 formed in the notched plate 6. An end portion (the lower end portion in the figure) of the base portion 8*a* is formed in an arcuate or semicircular shape in section and is rounded so as to permit the strut 8 to swing easily, while an end portion (the left end portion in the figure) of the engaging portion 8*b* is formed in a flat shape so that the said end portion comes into face contact with one inner wall 10*a* of the engaging recess 10 in the notched plate 6 upon engagement therewith.

Figure 15:
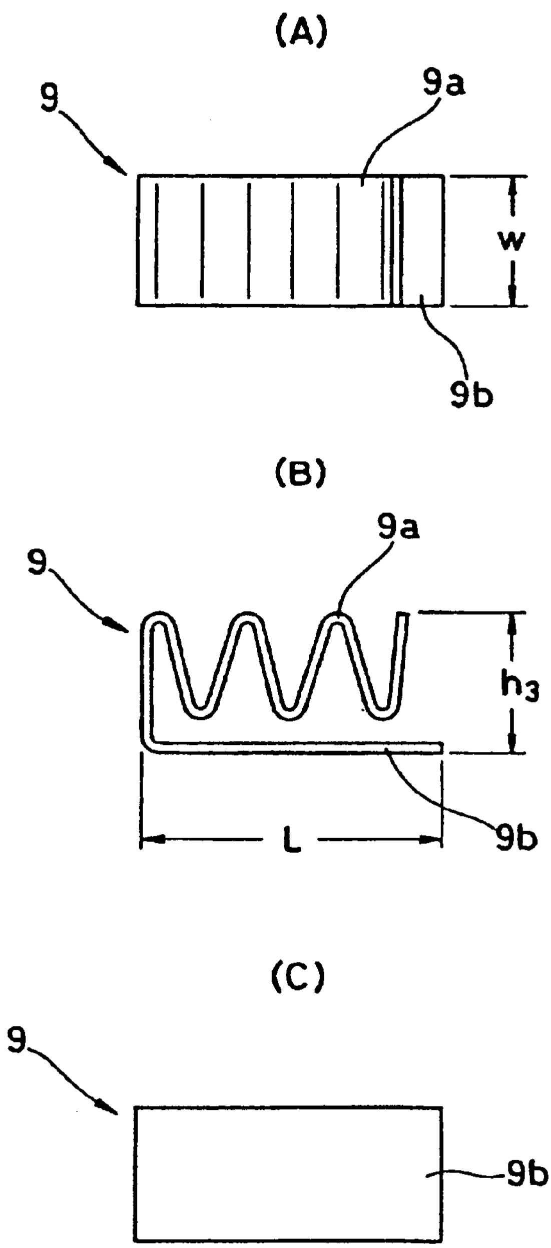
FIGS. 15(A), (B), and (C) are a plane view, a front view, and a bottom view, respectively, of a spring.
Figure 16:
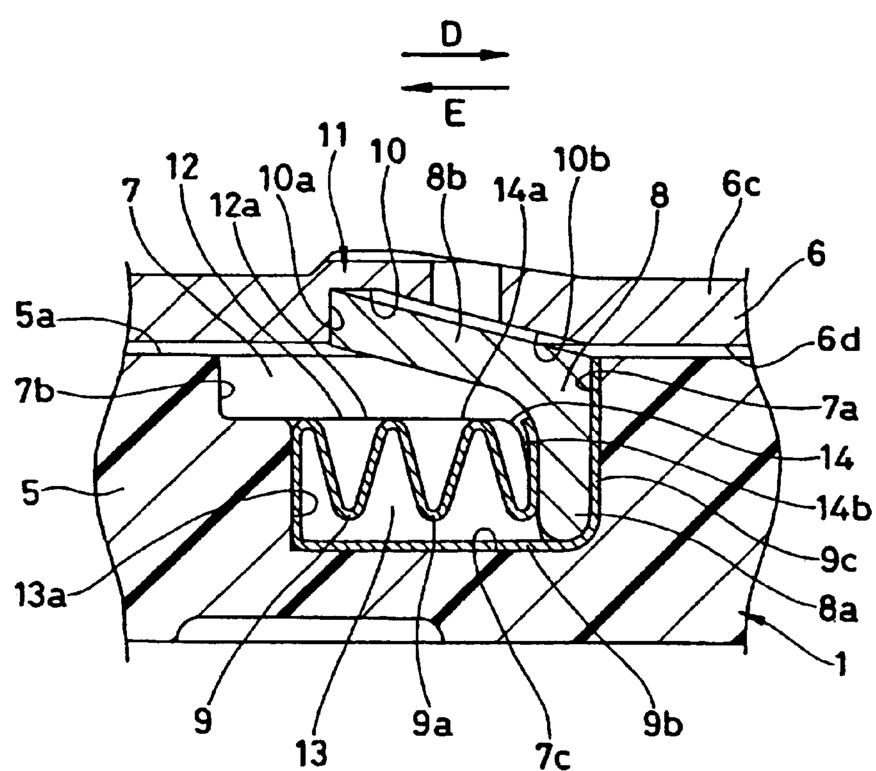
FIG. 16 is a sectional view of a principal portion of the stator of the fourth embodiment, showing another example of a spring.

As shown in FIG. 15, the spring 9 is formed as a plate spring using a predetermined metallic plate such as a spring steel plate and is corrugated in front view. An inner surface reinforcing portion (also designated a straight surface) 9*b* is formed integrally from one end of a plate spring portion 9*a* formed as such a plate spring to the opposite end side in an inverted fashion and at the same width as the width of the plate spring portion 9*a*. As shown in FIG. 14, the inner surface reinforcing portion 9*b* is laid on a bottom 7*c* of the pocket portion 7 and is thus interposed between the base portion 8*a* of the strut 8 and the bottom 7*c* of the pocket portion 7 to reinforce or protect the bottom 7*c* which is made of resin. As shown in FIG. 16, if the inner surface reinforcing portion 9*b* is further extended to form a rising portion 9*c* which is interposed between the base portion 8*a* of the strut 8 and an engaging face 7*a* of the pocket portion 7, the engaging face 7*a*, which is made of resin, can be protected or reinforced by the rising portion 9*c*.

Figure 17:
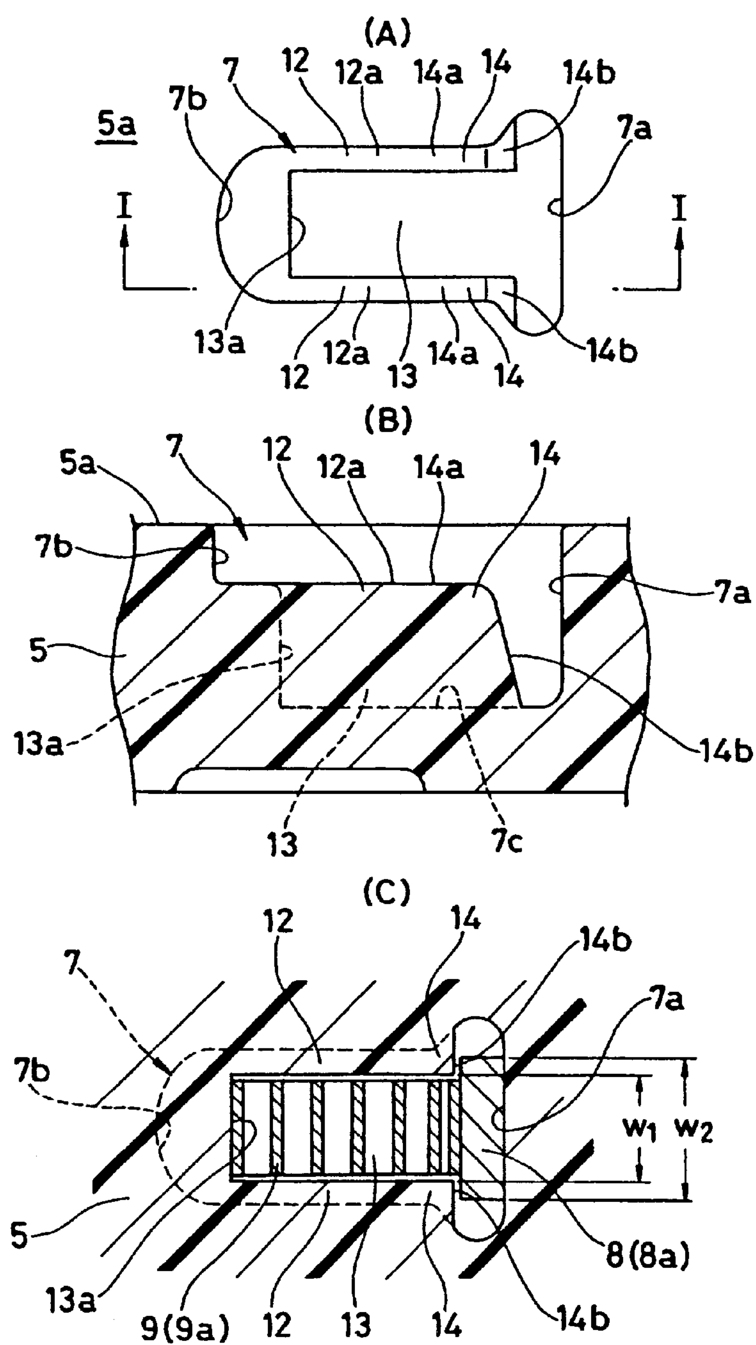
FIG. 17(A) is a plane view of a pocket portion, (B) is a sectional view taken on line I—I in (A), and (C) is a transverse sectional view showing a state in which a strut- and a spring are accommodated in the pocket portion.
Figure 18:
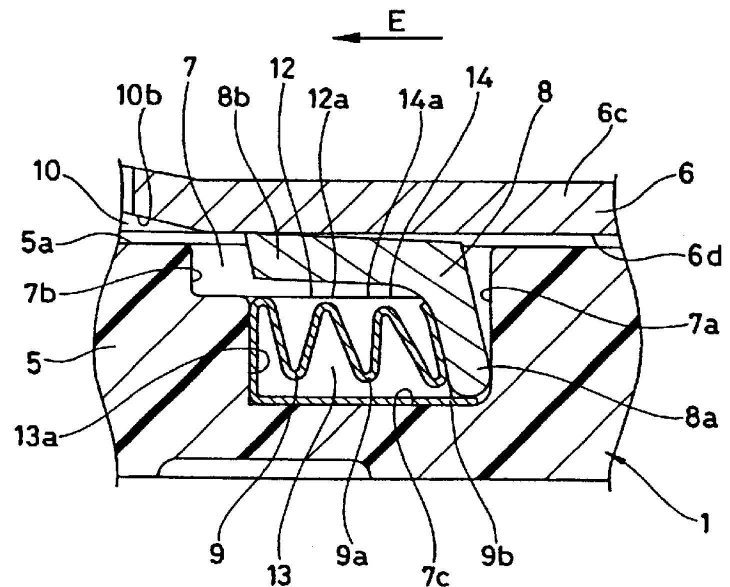
FIG. 18 is a sectional view of a principal portion, showing a state in which the strut in the stator of the fourth embodiment swung.
Figure 19:
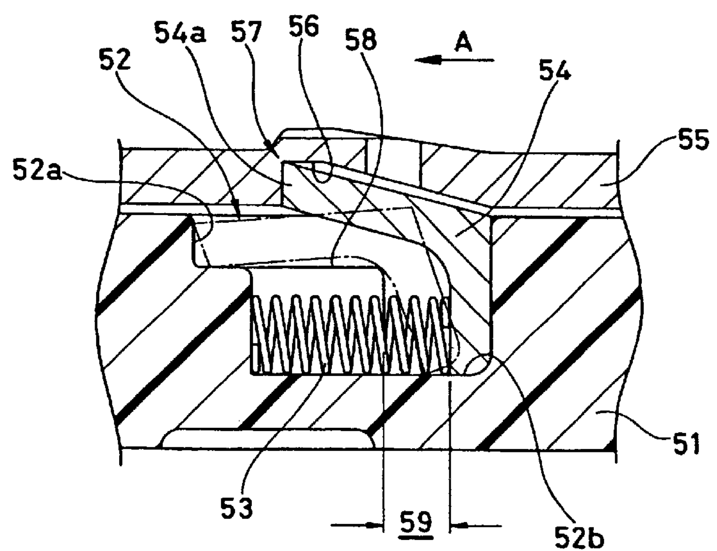
FIG. 19 is a sectional view of a principal portion of a stator.
Figure 20:
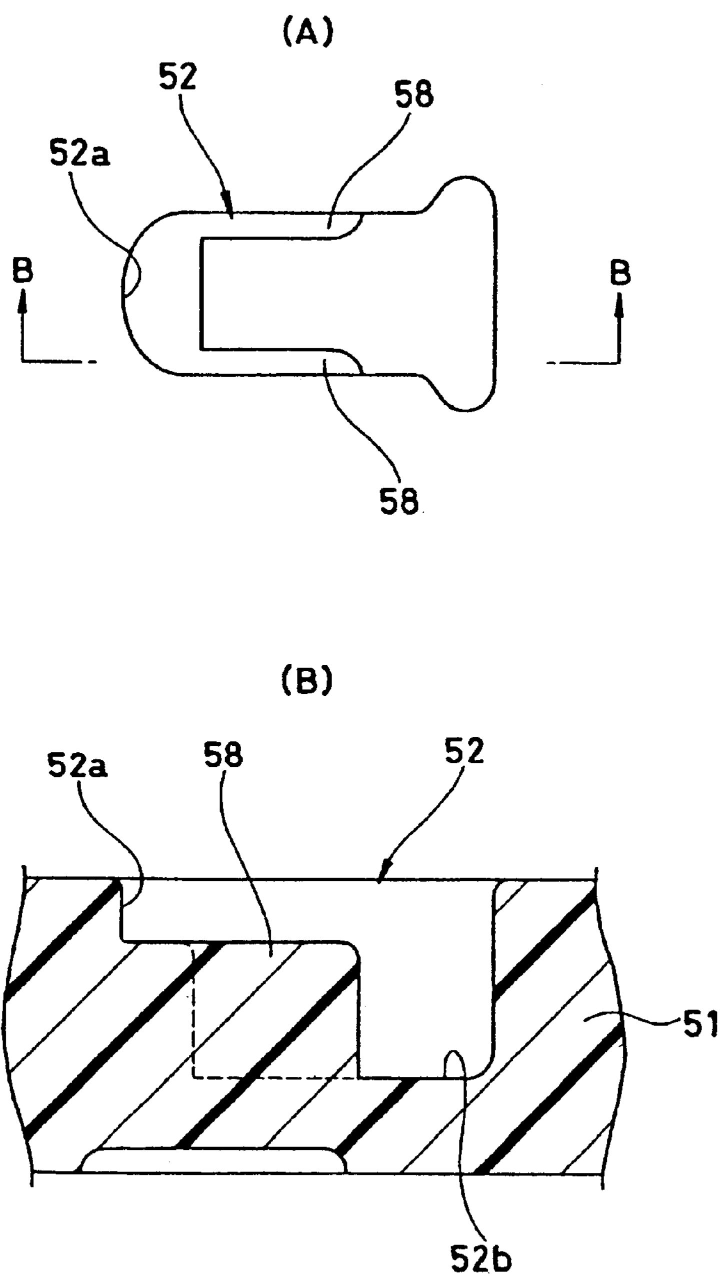
FIG. 20(A) is a plane view of a pocket portion used in a related invention and (B) is a sectional view taken on line B—B in (A).

As shown in FIGS. 14 and 17, the pocket portion 7 is open to the end face portion 5*a* of the pocket plate 5 and one inner wall thereof in the rotational direction is formed as a planar engaging face (also designated a strut engaging face or a strut supporting face) 7*a* which supports the base portion 8*a* of the strut 8 upon engagement of the clutch 11. Both end portions in the width direction of the engaging face 7*a* are recessed arcuately in plan and are rounded to disperse a stress induced when supporting the strut 8.

A swing angle limiting portion (also designated a swing stopper) 12 for limiting the swing motion of the strut 8 up to a predetermined angle is formed in the interior of the pocket portion 7 integrally by molding, and a movement limiting portion (also designated a movement stopper) 14 for limiting the movement of the strut 8 toward an anti-engaging face 7*b* in the interior of the pocket portion 7 is formed on the engaging face 7*a* side of the swing angle limiting portion 12 integrally by molding. Centrally in the width direction of the swing angle limiting portion 12 and the movement limiting portion 14 is formed a slot-like spring mounting portion 13 which is like a cutout portion formed by cutting out both portions 12 and 14 partially, and the spring 9 is mounted into the spring mounting portion 13. When the spring 9 is mounted in the spring mounting portion 13, its plate spring portion 9*a* is interposed in a moderately compressed state between an end wall portion 13*a* of the spring mounting portion 13 and the base portion 8*a* of the strut 8. With the spring 9 thus mounted, the strut 8 swings, centered on an end portion (also designated a strut end portion) of its base portion 8*a*, in the F direction against the resilience of the plate spring 9*a* and reverts to its illustrated posture under the resilience of the plate spring portion 9*a*. The width, $w_1$, of the spring mounting portion 13 is set smaller than the width, $w_2$, of the strut 8 so that the engaging portion 8*b* of the strut 8 comes into abutment against an end face 12*a* of the swing angle limiting portion 12 during a swing motion of the strut to limit the swing angle of the strut and so that the base portion 8*a* of the strut 8 comes into abutment against a rising face 14*b* of the movement limiting portion 14 during a swing motion of the strut to limit the movement of the strut.

The length L of the inner surface reinforcing portion 9*b* of the spring 9 mounted in the spring mounting portion 13 is set almost equal to the length from the end wall portion 13*a* of the spring mounting portion 13 up to the engaging face 7*a* of the pocket portion 7, and the width, w, of the inner surface reinforcing portion 9*b* is set almost equal to the width of the spring mounting portion 13. Further, an overall height, $h_3$, of the spring 9 is set almost equal to or lower than the height of the spring mounting portion 13 or the swing angle limiting portion 12 to prevent the strut 8 from coming into contact with the spring 9 during a swing motion of the strut 8.

The swing angle limiting portion 12 is formed in the shape of a dam or an inner shelf throughout the entire width of the pocket portion 7, and the movement limiting portion 14 is also formed in a dam, inner shelf, or stepped shape through the entire width of the pocket portion 7. The end face 12*a* of the swing angle limiting portion 12 and an en d face 14*a* of the movement limiting portion 14 are each formed in the shape of a plane and are flush with each other, having the same height. The rising face 14*b* of the movement limiting portion 14, which is opposed to the base portion 8*a* of the strut 8, is tapered to let the base portion 8*a* come into face contact with the rising face 14*b* when the strut 8 swings. The space between the tapered rising face 14*a* and the engaging face 7*a* is formed so as to permit a swing motion of the base portion 8*a* of the strut 8 but not to permit movement thereof at all. The anti-engaging face 7*b* is opposed to the engaging face 7*a* and is formed arcuately in plan as shown in FIG. 17.

The resinous stator constructed as above is characterized by exhibiting the following functions and effects.

Firstly, since the movement limiting portion 14 for limiting the movement of the strut 8 toward the anti-engaging face 7*b* in the pocket portion 7 is formed on the engaging face 7*a* side of the swing angle limiting portion 12 in the interior of the pocket portion 7 integrally by molding, the movement of the strut 8 toward the anti-engaging face 7*b*, in which movement of the strut is dragged by the notched plate 6, is limited and the contact thereof with the anti-engaging face 7*b* is prevented. Consequently, wear of the anti-engaging face 7*b* caused by such contact can be prevented and hence it is possible to prevent the operation of the one-way clutch 11 from being impeded by such wear. Thus, it is possible to ensure a normal operation of the one-way clutch 11 over a long period.

Moreover, since the inner surface reinforcing portion 9*b* integral with the plate spring portion 9*a* of the spring 9 is interposed between the base portion 8*a* of the strut 8 and the bottom 7*c* of the pocket portion 7 which receives the strut 8 therein, thereby preventing the strut 8 from coming into direct sliding contact with the bottom 7*c* of the pocket portion 7, it is possible to prevent wear of the bottom 7*c* of the pocket plate 7. Further, in the case where the rising portion 9*c* is integral with the inner surface reinforcing portion 9*b* of the spring 9 and is interposed between the base portion 8*a* of the strut 8 and the engaging face 7*a* of the pocket portion 7, the engaging face 7*a* can be reinforced by the rising portion 9*c*. Consequently, it is possible to suppress wear of the inner surface of the pocket portion 7 and prevent the operation of the one-way clutch 11 from being impede d by such wear, thus making it possible to ensure a normal operation of the one-way clutch 11 over a long period.

Besides, since the inner surface reinforcing portion 9*b* is integral with the plate spring portion 9*a* of the spring 9, it does not lead to an increase in the number of components. Therefore, the fabrication and mounting of the spring 9 do not become so difficult and it is possible to ensure the easiness of its handling.

Further, since the length L of the inner surface reinforcing portion 9*b* is set almost equal to the length from the end wall portion 13*a* of the spring mounting portion 13 to the engaging face 7*a* of the pocket portion 7 and the width, w, thereof is set almost equal to the width of the spring mounting portion 13, the spring 9 integral with the inner surface reinforcing portion 9*b* is held stably and therefore the rigidity of the spring 9 can be enhanced.

The present invention brings about the following effects.

First, in the stator of claim 1 constructed as above, since a movement limiting portion for limiting the movement of the strut toward the anti-engaging face side in the pocket portion is formed on the engaging face side of the swing angle limiting portion in the pocket portion integrally by molding, the movement of the strut toward the anti-engaging face side during idle running of the clutch, in which movement of the strut is dragged by the notched plate, is limited and the strut is thereby prevented from coming into contact with the anti-engaging face. Consequently, it is possible to prevent wear of the anti-engaging face caused by such contact and hence possible prevent the operation of the one-way clutch from being impeded by such wear, thus making it possible to ensure a normal operation of the one-way clutch over a long period.

In the stator of claim 2 constructed as above, since a spring is disposed between the bottom of a bottomed hole-like spring mounting portion which is open to an end face of the swing angle limiting portion and an engaging portion of the strut which is accommodated in the pocket portion, the spring thus disposed being capable of expansion and contraction axially of the stator, the strut and the spring can be mounted completely in the pocket portion merely by first inserting the spring into the spring mounting portion and then putting the strut on the spring. Thus, it is not required to compress the spring at the time of mounting the strut. Consequently, it is possible to facilitate the mounting work for these components. If the spring is inserted vertically into the hole-like spring mounting portion which is open to an end face of the swing angle limiting portion, the spring can be held stably after the mounting thereof and is difficult to be displaced within the pocket portion. Further, since the hole-like spring mounting portion functions as a guide for the expanding or contracting motion of the spring with a swing motion of the strut, the operation of the spring becomes stable and the service life thereof is prolonged.

In the stator of claim 3 constructed as above, since the notched plate-side face of the engaging portion of the strut is formed in a generally "⌒" shape in section comprising a base end-side slant face and a tip end-side slant face, the tip end-side slant face being smaller in the angle of inclination than the base end-side slant face and being pushed against the notched plate by the resilience of the spring during idle running of the clutch, an outer corner portion at the boundary between the base portion and the engaging portion of the strut can be prevented from interfering with an end face portion of the notched plate under an axial force of the spring at the tip end-side slant face of the strut. Therefore, the strut becomes difficult to be dragged by the notched plate and thus also in this case it is possible to prevent the movement of the strut within the pocket portion. Moreover, by allowing the tip end-side slant face to undertake the load of the spring and the interference with the notched plate, it is possible to restrict the height of the strut in the swing motion and hence possible to hold the strut stably within the pocket portion.

Since the notched plate-side face of the strut is formed in a generally "⌒" shape in section wherein the tip end-side slant face is smaller in the angle of inclination than the base end-side slant face, it is possible to take an appropriate anti-wear measure without decreasing the height on the notched plate side and the height on the pocket portion side which are considered necessary for engagement.

In the stator of claim 4 or claim 6 constructed as above, an end portion of the strut located on the rearmost side in the relative rotation, which end portion comes into contact with an end face portion of the notched plate during idle running of the clutch, is positioned on the front side in the relative rotation with respect to the axis of the spring mounted in the bottomed hole-like spring mounting portion, the engaging portion of the strut, which is biased resiliently by the spring, is pushed against the end face portion of the notched plate and a turning moment is developed in a direction in which the base portion of the strut is received deep in the pocket portion. In other words, a turning moment is not developed in a direction in which the base portion of the strut is pushed out from the pocket portion, so that the base portion of the strut is not pushed out from the pocket portion. Therefore, an outside corner portion at the boundary between the base portion and the engaging portion can be prevented from interfering with the end face portion of the notched plate and so wear of the outside corner portion can be prevented.

In the stator of claim 5 or claim 6 constructed as above, since an end portion of the strut located on the rearmost side in the relative rotation, which end portion comes into contact with an end face portion of the notched plate during idle running of the clutch, is positioned at the same circumferential position as the axis of the spring mounted in the bottomed hole-like spring mounting portion, a turning moment, also in this case, is not generated in a direction in which the base portion of the strut is pushed out from the pocket portion, so that the base portion is not pushed out from the pocket portion. Accordingly, an outside corner portion at the boundary between the base portion and the engaging portion of the strut can be prevented from interfering with the end face portion of the notched plate and so wear of the outside corner portion can be prevented.

In the stator of claim 7 constructed as above, since an inner surface reinforcing portion is interposed between the strut and the bottom of the pocket portion,.the strut does not come into sliding contact with the bottom of the pocket portion. Therefore, it is possible to prevent wear of the bottom of the pocket portion and hence possible to prevent the operation of the one-way clutch from being impeded, thus making it possible to ensure a normal operation of the one-way clutch over a long period.

Further, since the inner surface reinforcing portion is integral with the plate spring portion, the use thereof does not lead to an increase in the number of components. Therefore, the fabrication and mounting of the spring do not become so difficult and it is possible to ensure the easiness of its handling.

What is claimed is:

1. A stator including:

a notched one-way clutch having a strut which is accommodated, together with a spring, within a pocket portion formed in a resinous stator body and also having a notched plate combined with the stator body in a relatively rotatable manner and provided with an engaging recess with which the strut comes into engagement in one rotational direction, with a swing angle limiting portion being formed in the pocket portion to limit a swing motion of the strut up to a predetermined angle, and wherein a movement limiting portion for limiting the movement of the strut toward an anti-engaging face side within the pocket portion is formed on an engaging face side of the swing angle limiting portion integrally by molding.

2. The stator according to claim 1, wherein a spring is disposed between a bottom of a spring mounting portion and an engaging portion of the strut accommodated in the pocket portion in such a manner that the spring can expand and contract axially of the stator, the spring mounting portion being in the shape of a bottomed hole which is open to an end face of the swing angle limiting portion.

3. The stator according to claim 2, wherein the notched plate side face of the engaging portion of the strut is formed in a generally "⌒" shape in section comprising a base end-side slat face and a tip end-side slant face the tip end-side slat face being smaller in the angle of inclination than the base end-side slant face and being pushed against the notched plate by the resilience of the spring during idle running of the clutch.

4. The stator according to claim 2, wherein the strut is formed so that an end portion of the strut located on a rearmost side in the relative rotation, which end portion comes into contact with an end face portion of the notched plate during idle running of the clutch, is positioned on a front side in the relative rotation with respect to an axis of the spring mounted in the bottomed hole-like spring mounting portion.

5. The stator according to claim 2, wherein the strut is formed so that an end portion of the strut located on a rearmost side in the relative rotation, which end portion comes into contact with an end face portion of the notched plate during idle running of the clutch, is positioned at the same circumferential position as an axis of the spring mounted on the bottomed hole-like spring mounting portion.

6. The stator according to claim 4, wherein a cutout portion is formed in a tip end of the engaging portion of the strut.

7. A stator including:

a notched one-way clutch having a plurality of pocket portions formed in a stator body, each of the pocket portions containing a strut together with a spring, within the pocket portion and a notched plate combined with the stator body in a relatively rotatable manner and provided with an engaging recess with which the strut comes into engagement in one rotational direction, with a swing angle limiting portion being formed in the pocket portion to limit a swing motion of the strut up to a predetermined angle, the spring being a plate spring having an inner surface reinforcing portion formed integrally and interposed between the strut and a bottom of the pocket portion, a movement limiting portion for limiting the movement of the strut toward an anti-engaging face side within the pocket portion being formed on an engaging face side of the swing angle limiting portion integrally by molding.

* * * * *